United States Patent [19]
Kobayashi et al.

[11] Patent Number: 5,670,978
[45] Date of Patent: Sep. 23, 1997

[54] LIGHT MODULATOR USING AN ASYMETRICALLY-DRIVEN FERROELECTRIC LIQUID CRYSTAL THICK CELL

[75] Inventors: Junya Kobayashi; Junichi Kita, both of Kyoto, Japan

[73] Assignee: Shimadzu Corporation, Kyoto, Japan

[21] Appl. No.: 364,298

[22] Filed: Dec. 27, 1994

[30] Foreign Application Priority Data

| Dec. 28, 1993 | [JP] | Japan | 5-338237 |
| Apr. 20, 1994 | [JP] | Japan | 6-081973 |
| Aug. 26, 1994 | [JP] | Japan | 6-202455 |

[51] Int. Cl.$^6$ ........................... G06F 3/00
[52] U.S. Cl. .............. 345/94; 345/95; 345/97; 359/56; 359/63; 359/103; 359/104
[58] Field of Search ............... 345/94, 95, 97; 359/56, 100, 104, 84, 85, 57, 103, 90, 63

[56] References Cited

U.S. PATENT DOCUMENTS

| 4,508,429 | 4/1985 | Nagae et al. | 345/97 |
| 4,773,738 | 9/1988 | Hayakawa et al. | 359/56 |
| 4,943,387 | 7/1990 | Furukawa et al. | 359/104 X |
| 4,952,335 | 8/1990 | Furukawa et al. | 359/103 X |
| 5,013,137 | 5/1991 | Tsuboyama et al. | 359/56 |
| 5,046,830 | 9/1991 | Nakanowatari | 359/90 |
| 5,061,047 | 10/1991 | Bradshaw et al. | 359/63 |
| 5,204,660 | 4/1993 | Kamagami et al. | 345/95 |
| 5,327,273 | 7/1994 | Beresnev et al. | 359/104 |

FOREIGN PATENT DOCUMENTS

| 0 257 638 | 3/1988 | European Pat. Off. |
| 60-195521 | 10/1985 | Japan |
| 60-254120 | 12/1985 | Japan |
| 61-260227 | 11/1986 | Japan |

OTHER PUBLICATIONS

Ferroelectrics. Aug. 1984, UK. vol. 58/59, No. 1–4/1–2, ISSN 0015-0193. pp. [465]145-[480]160.
Yoshino K et al. "Transient light scattering by domain switching in ferroelectric liquid crystal and its application as fast opto–electronics device".
Molecular Crystals and Liquid Crystals. May 1987, UK. vol. 146, ISSN 0026-8941, pp. 251-264.
Ozaki M et al. "Characteristics of transient light scattering in ferroelectric liquid crystals".
Patent Abstracts of Japan, vol. 011 No. 112 (P-565). 9 Apr. 1987 & JP-A-61 260227 (Katsumi Yoshino) 18 Nov.1966.
Patent Abstracts of Japan, vol. 010 No. 132 (P-456).16 May 1986 & JP-A-60 254120 (Katsumi Yoshino: Others:01) 14 Dec. 1985.
Patent Abstracts of Japan. vol. 010 No. 052 (P-432), 28 Feb. 1986 & JP-A-60 195521 Katsumi Yoshino) 4 Oct. 1985.
Ferroelectrics. Aug. 1984, UK, vol. 58/59. No. 1–4/1–2, ISSN 0015-0193. pp. [465]145-[480]160.
Yoshino K et al "Transient light scattering by domain switching in ferroeletric liquid crystal and its application as fast opto–electronics device".

(List continued on next page.)

*Primary Examiner*—Mark R. Powell
*Assistant Examiner*—Seth D. Vail
*Attorney, Agent, or Firm*—Oliff & Berridge

[57] ABSTRACT

In a liquid crystal thick cell light modulator using ferroelectric liquid crystal, a series of voltage pulses with an asymmetrical duty ratio (that is, duty ratio of 55–85%) is applied between a pair of electrode plates containing the ferroelectric liquid crystal. In another liquid crystal thick cell light modulator using ferroelectric liquid crystal, a DC bias voltage is added to the voltage pulses, where the magnitude of the DC bias voltage is 20–50% of the half amplitude of the voltage pulses. In still another liquid crystal thick cell light modulator, the gap length between the electrode plates is larger than 50 μm, and the helical pitch in smectic C phase of the ferroelectric liquid crystal is 0.7 to 0.95 times the gap length.

8 Claims, 13 Drawing Sheets

OTHER PUBLICATIONS

Molecular Crystals and Liquid Crystals, May 1987, UK, vol. 146, ISSN 0026-8941, pp. 251-254 Ozaki M et al. "Characteristics of transient light scattering in ferroelectric liquid crystrals".

Proceedings of the Sixth International Meeting on Ferroelectricity, Kobe, Japan. 12-16 Aug. 1985. Japanese Journal of Applied Physics, Supplement 24-2, 1985, Japan. pp. 130-133 Yoshino K et al. "Characteristics of transient light scattering in ferroelectric liquid crystals as functions of molecular structure. cell thickness and temperature and their applications".

Patent Abstracts of Japan, vol. 011 No. 112 (P-565), 9 Apr. 1987 & JP-A-61 260227 (Katsumi Yoshino) 18 Nov. 1986.

Patent Abstracts of Japan, vol. 010 No. 132 (P-456). 16 May 1986 & JP-A-60 254120 (Katsumi Yoshino: Others:01) 14 Dec. 1985.

Patent Abstracts of Japan, vol. 010, No. 052 (P-432). 28 Feb. 1985 & JP-A-60 195521 Katsumi Yoshino) 4 Oct. 1985.

FIG. 1

Fig. 2A
DUTY RATIO=50%
VOLTAGE ±30V, 70Hz

PHOTODIODE OUTPUT

Fig. 2B
DUTY RATIO=60%

Fig. 2C
DUTY RATIO=70%

Fig. 2D
DUTY RATIO=80%

LIGHT MODULATOR USING AN ASYMETRICALLY-DRIVEN FERROELECTRIC LIQUID CRYSTAL THICK CELL

The present invention relates to a light modulator using a liquid crystal thick cell containing ferroelectric liquid crystal. A light modulator is used as a chopper to pass and stop light (including visible light and infrared light) and can be used in photo-measurement apparatus, gas analyzer, infrared light sensor, non-contacting type thermometer, temperature sensor for a cooking range, etc.

BACKGROUND OF THE INVENTION

There are several types of infrared light sensors such as a pyroelectric type and a photoconductive type, in which electric signals cannot be generated by the infrared light by itself. For sensing infrared light and for generating electric signals in those sensors, the infrared light should be chopped, or modulated.

Conventional liquid crystal cells are classified into several types including: a refraction type, dynamic scattering type, light scattering type, etc. The refraction type uses a pair of polarizing plates and is represented by the twisted nematic (TN) type liquid crystal cell using nematic liquid crystal. The dynamic scattering type also uses the nematic liquid crystal. The light scattering type utilizes the phase transition between the cholesteric phase and the nematic phase.

When long wavelength light (such as infrared light) passes a refraction type liquid crystal cell, the cell must be thick corresponding to the wavelength to rotate the polarity of light properly, which leads to a very poor responsiveness to alternating voltage pulses. In the dynamic scattering type, the driving voltage must be lowered to enhance the scattering efficiency, which also leads to a poor responsiveness. Further in the light scattering type, the resolving speed of the helical structure of liquid crystal molecules in the cholestic phase is so low that the responsiveness is also low.

On the other hand, ferroelectric liquid crystals are expected to a wide variety of applications, e.g. to display panels, light modulators, etc. because of their high responsiveness to the change in the electric field. There are two types of light modulators that use ferroelectric liquid crystals: a thin cell type and a thick cell type. The thin cell type liquid crystal cells have the cell gap of several μm. They have a pair of polarizing plates and utilize the birefringence of the liquid crystal contained therein. Because of the transmission loss in the two polarizing plates, the transmittance of the thin cell type liquid crystal cells is inevitably less than 50%. Another drawback is that the modulating efficiency (which is defined by the difference in the transmittance between the transparent state and the light scattering or opaque state) becomes lower as the refraction index decreases at longer wavelength (that is, in the infrared region) because they use birefringent mode as the TN type does.

The thick cell type liquid crystal cells have the cell gap of 50 to several hundreds μm, and have a good scattering characteristics because they use transitional scattering phenomenon, which enables their use in light modulators. The transitional scattering of the thick cell type liquid crystal cells makes use of the backscattering of the primary light due to the disorder in the liquid crystal molecular array in the smectic C phase when the polarity of the driving voltage is reversed (Japanese laid open patent application Nos. S60-195521, S60-254120 and S61-260227). Since they do not need polarizing plates, the manufacturing cost is low and high transmittance (low transmission loss) is possible. Because those advantages are applicable to infrared light as well as to visible light, the liquid crystal thick cells are expected to be used to modulate (or chop) infrared light, which is necessary in gas analyzers. It is already known that a certain modulating efficiency for infrared light as well as visible light is obtained by applying symmetrical voltage pulses (that is, 50% duty ratio) between the two electrodes of the liquid crystal thick cell.

In a light modulator of liquid crystal thick cell using ferroelectric liquid crystal, the driving electric field (or the driving voltage) is reversed to change the liquid crystal from the transparent state to the light scattering state. The responding speed from the transparent state to the light scattering (or opaque) state is very high (tens of μsec) owing to the high responsiveness of the ferroelectric liquid crystal itself. But it takes a very long time to restore the transparent state from the light scattering state (tens to hundreds msec). It is attributed to the fact that the light scattering state is a transitional state from one ordered (transparent) state of the liquid crystal molecules to the other ordered (transparent) state. When light scattering state changes to the transparent state, lamellar domains of aligning molecules develop in the whole disorder, and the domains grow until the entire liquid crystal in the cell align to a clear transparent state.

Some methods are reported in the above cited Japanese laid open patent applications to keep the light scattering (opaque) state. But none of the methods can reduce the time needed to make the light scattering state to the transparent state.

Another drawback of the conventional driving method using symmetrical voltage pulses is that the highest practical modulating frequency is several tens of Hz irrespective of the refraction type and scattering type. That is, conventional light modulators cannot be used in infrared light sensors which requires high speed chopping of infrared light.

SUMMARY OF THE INVENTION

According to the present invention, one type of liquid crystal thick cell light modulator includes a thick cell containing ferroelectric liquid crystal between a pair of parallel electrode plates and a voltage applying circuit for applying a series of voltage pulses with an asymmetrical duty ratio (that is, the duty ratio is not 50%) between the pair of electrode plates.

Another type of liquid crystal thick cell light modulator according to the present invention includes a thick cell containing ferroelectric liquid crystal between a pair of parallel electrode plates and a voltage applying circuit for applying a series of voltage pulses with a DC bias voltage added to the voltage pulses between the pair of electrode plates.

Compared to the conventional light modulators in which the duty ratio of the voltage pulses applied on the electrodes is symmetrical (or 50%), the light modulators of the present invention have higher modulating efficiency for infrared light as well as for visible light, and higher responsiveness, which enables light modulation at higher frequencies. The responsiveness of the light modulators of the present invention is improved because the rotation of the spontaneous polarization of the ferroelectric liquid crystal molecules is not completed but stopped halfway and returned to the original direction when the liquid crystal is changed from the light scattering state to the transparent state. Further, the higher modulating frequency of the light modulator of the present invention is obtained because the size of the domains formed in the light scattering state is suitable for scattering the light.

An example of the asymmetrical duty ratio is from 55 to 85%, and a more preferable range is from 58 to 75%. The optimal duty ratio depends on the design and use of the thick cell, and it is preferable to implement a duty ratio adjusting circuit in the voltage applying circuit (power circuit).

When the amplitude of the voltage pulses is ±40 V, for example, the DC bias voltage of 10 to 15 V (that is, 25 to 40% of the half amplitude) produces large modulating efficiency. A broader range of 20 to 50% of the half amplitude still yields remarkable modulating efficiency distinguishable from very small modulating efficiency in no bias 50% duty ratio case. For the DC bias voltage also, it is preferable to implement a bias voltage adjusting circuit in the voltage applying circuit (power circuit).

The asymmetrical voltage pulses and the DC bias can be applied simultaneously on the electrodes of a thick cell. In this case, it is also preferable to implement both the bias voltage adjusting circuit and the DC bias voltage adjusting circuit in the voltage applying circuit (power circuit).

The specific resistance of the electrodes is recommended to be larger than 0.5 $\Omega \cdot cm$, more preferably larger than 2 $\Omega \cdot cm$ because the transmittance deteriorates with the specific resistance of less than 0.5 $\Omega \cdot cm$. The deterioration of the transmittance occurs especially at longer wavelengths (10 μm).

The thick cell of the present invention is composed of a pair of parallel electrode plates and ferroelectric liquid crystal contained between the electrode plates. The electrode plates may be made of glass plates with conductive films on the surfaces such as vapor deposited ITO (Indium Tin Oxide) films. The electrode plates may be made of silicon plates or germanium plates doped with impurities. The electrode plates are placed parallel with a gap of larger than 50 μm (100 to 300 μm is preferred). Spacers, such as Lumilar (trade name of Toray Corp.) polyester sheet, is useful to define and fix the gap and seal the space between the pair of electrode plates. Cell gap of less than 50 μm leads to a poor modulating efficiency.

Figure 12:
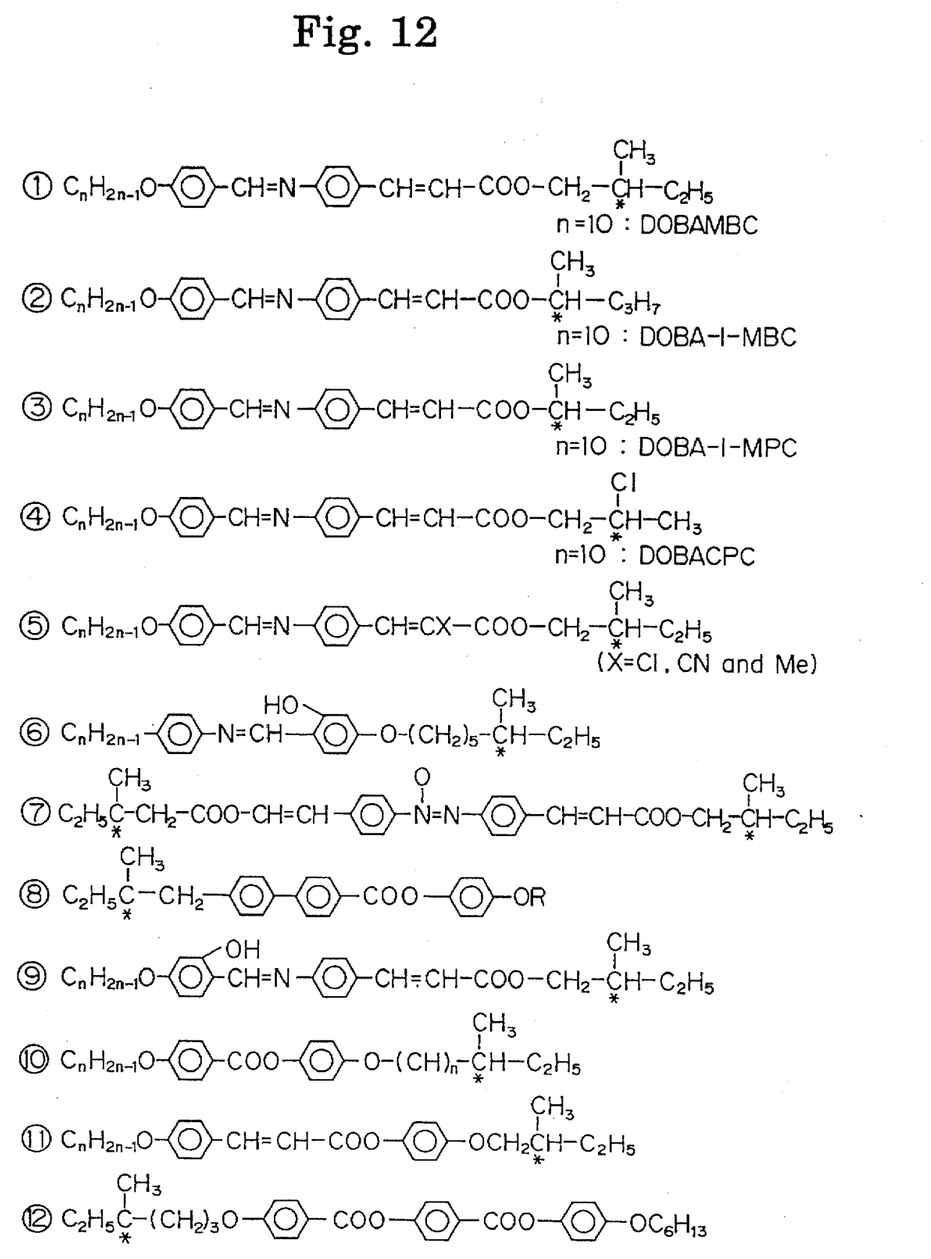
FIG. 12 is a structural chart of various ferroelectric liquid crystal molecules.

For the ferroelectric liquid crystal contained between the electrode plates, Schiff base, azoic, azoxy, benzoate ester, biphenyl, terphenyl, cyclohexylcarbonic acid ester, phenylcyclohexane, pyrimidine or oxane liquid crystals (or a combination of any of the above liquid crystals) can be used. The molecular structure of the liquid crystals are shown in FIG. 12. These and other liquid crystals are described in "The Structure and Characteristics of Ferroelectric Liquid Crystal", pp. 229–234, Corona Corp. The liquid crystals are available in the market with the trade names of CS-1014, CS-1017 (Chisso Petroleum Corp.), ZLI-1013 or ZLI-1011 (Merck Corp.).

The third type of liquid crystal thick cell light modulator according to the present invention includes:

a thick cell including a pair of parallel electrode plates with a gap length between the electrode plates larger than 50 μm;

ferroelectric liquid crystal contained between the pair of electrode plates with a helical pitch of the ferroelectric liquid crystal in smectic C phase being 0.7 to 0.95 times the gap length; and a voltage applying circuit for applying a series of voltage pulses between the electrode plates.

More favorable range of the helical pitch is 0.8 to 0.9 times the gap length. Helical pitch of less than 0.7 times the gap length leads to lower transmittance in the transparent state because aligning of the liquid crystal molecules becomes insufficient and the domain becomes so small that the transmittance in the clear (transparent) state deteriorates. Helical pitch greater than 0.95 times is also unfavorable because the liquid crystal helixes expand or vanish and it becomes difficult to form domains so that adequate light scattering is hardly realized. This teaches that the modulating efficiency depends strongly on the cell gap and the helical pitch, and enough modulating efficiency is obtained only with larger helical pitch when the cell gap is increased.

When the helical pitch condition (0.7 to 0.95 times the gap length) cannot be met with the ferroelectric liquid crystals alone, a pitch adjusting agent can be added to the liquid crystal. Any known pitch adjusting agent can be used, and it is possible to use achiral liquid crystal for the pitch adjusting agent. When ferroelectric liquid crystal of 5 μm helical pitch is used, the ferroelectric liquid crystal should be diluted 20 times with pitch adjusting agent to obtain 100 μm helical pitch.

The ferroelectric liquid crystal cell light modulator of the present invention can be used for visible light as well as for infrared light. When near infrared light of 0.8–3 μm wavelength or middle infrared light of 3–8 μm wavelength is intended, the cell gap is recommended to be greater than 100 μm. When far infrared light of 8–25 μm wavelength is intended, 50–100 μm cell gap is recommended. If the cell gap is larger in this case, far infrared light is absorbed by the liquid crystal due to the molecular vibration of the ferroelectric liquid crystal.

The helical pitch condition is of course recommended to combine with the asymmetrical or biased voltage pulse applying method.

DETAILED DESCRIPTION OF PREFERRED EMBODIMENTS

Figure 1:
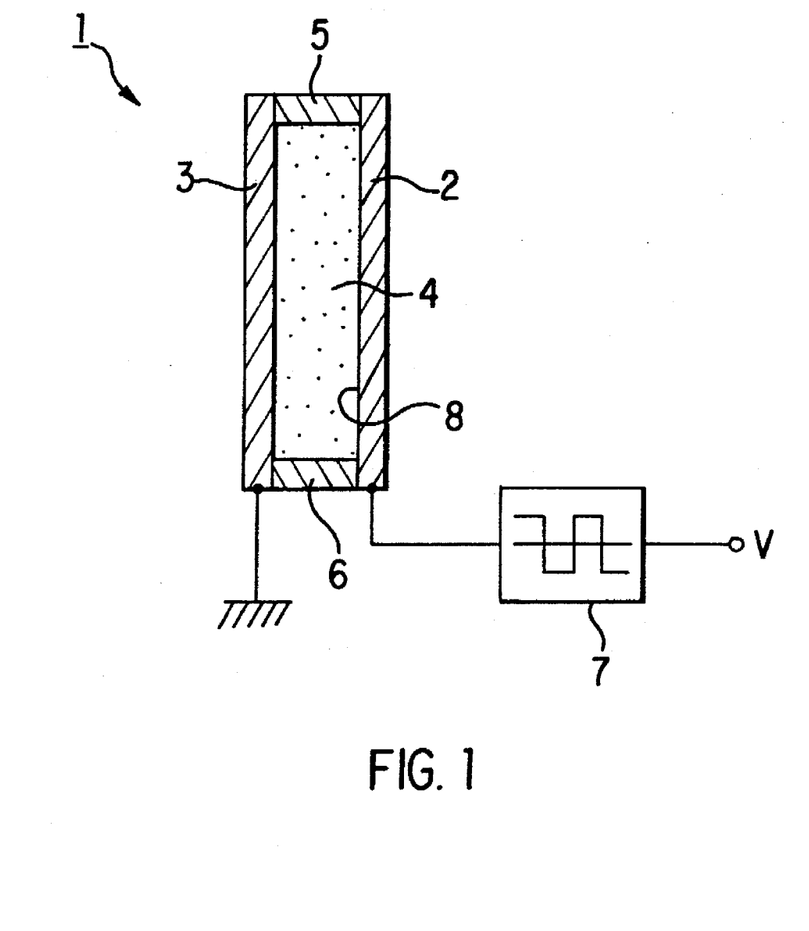
FIG. 1 is a cross sectional view of a ferroelectric liquid crystal thick cell light modulator according to the present invention.

The liquid crystal thick cell light modulator 1 shown in FIG. 1 is made of a thick cell 8 and a voltage applying circuit 7. The thick cell 8 is composed of: a pair of parallel electrode plates 2 and 3; spacers 5 and 6 for defining the gap length between the electrode plates 2, 3; and ferroelectric liquid crystal 4 contained in the cell formed by the electrode plates 2, 3 and the spacers 5, 6.

The voltage applying circuit 7 applies asymmetrical voltage pulses between the pair of electrode plates 2 and 3. The degree of the asymmetry, or the duty ratio, of the voltage pulses (which is the ratio of the duration of a plus period to the duration of a whole cycle composed of a plus period and a minus period), is 55 to 85%. When a direct current (DC) electric field of a polarity is applied over the ferroelectric liquid crystal cell, the molecules of the liquid crystal align along the direction of the electric field, whereby the liquid crystal cell is optically transparent. When the polarity of the electric field is instantaneously reversed ("instantaneously" means that the reversing time is less than the normal response time of ferroelectric liquid crystal of μsec order), the liquid crystal molecules move randomly because they cannot follow the fast change of the electric field, whereby the light scattering state is achieved. Since sufficient light scattering capability is obtained in the early stage of randomization, the liquid crystal molecules can return to the original clear state aligned in the original orientation in a shorter time if the polarity of the applied voltage is returned to the original polarity before the molecules completely realign in the opposite orientation. This reduces the time needed to change the light scattering state to the transparent state. The returning to the original aligned state at halfway to the opposite aligned state is achieved by applying voltage pulses with asymmetrical duty ratio.

Figure 13:
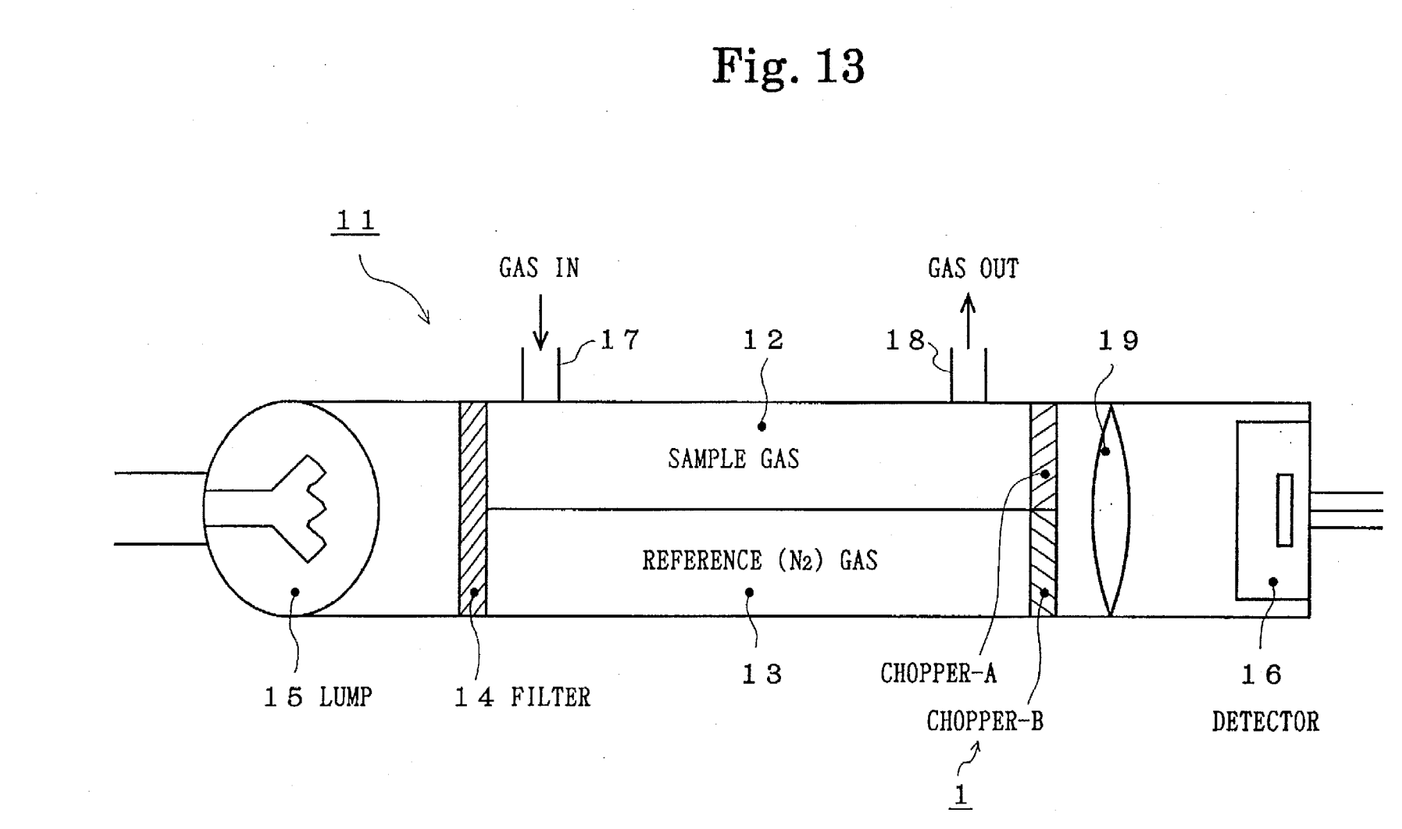
FIG. 13 is a cross sectional view of a gas analyzer using a ferroelectric liquid crystal thick cell light modulator of the present invention.

An application of the liquid crystal thick cell light modulator 1 of FIG. 1 to a gas analyzer is shown in FIG. 13. The gas analyzer is mainly composed of a sample gas cell 12, a reference gas cell 13, a halogen lamp 15, a detector 16, and a liquid crystal chopper 1 using the thick cell light modulator. The halogen lamp 15 casts light through an interference filter 14 to the two gas cells 12 and 13. The detector 16 uses pyroelectric material of lithium tantalic acid. The liquid crystal chopper 1 is composed of two choppers A and B: chopper A corresponds to the sample cell 12 and chopper B corresponds to the reference cell 13. The two choppers can be made as a unit. In FIG. 13, numeral 17 denotes a sample gas entrance, numeral 18 denotes a sample gas exit and numeral 19 denotes a convex lens. Since a change in the electric charge on the surface of the pyroelectric material of the detector 16 is observed transitionally according to the irradiation of light, it is necessary to continue the transitional state by placing the light chopper i before the detector 16. The maximum sensitivity of the pyroelectric material is obtained at relatively high frequency (several hundreds of Hz) which is realized solely by the ferroelectric liquid crystal thick cell of the present invention.

The operation of the gas analyzer 11 is as follows. The infrared light generated by the halogen lamp 15 passes through the interference filter 14 and enters the sample gas cell 12 and the reference gas cell 13. The infrared light that has passed through the sample gas (e.g., $CO_1/CO$) in the cells 12 and 13 is chopped by the chopper 1 and detected by the detector 16. In the liquid crystal chopper 1 (that is, the choppers A and B), asymmetric voltage pulses are applied on the electrode plates. Since, as described above, the pyroelectric material can sense only modulated light, the simplest way of signal processing of the signals detected by the detector 16 is to operate the light choppers A and B alternately. By operating the two choppers A and B with different frequencies, the signals of the two gas cells can be separated in the electric circuit.

Example 1: Test with visible light

The test cell uses glass plates with an ion diffused ITO (Indium Tin Oxide) film on the surface. The inner surface of the glass plates are rubbed in one direction by cotton cloth before they are fixed together. The gap of the cell is defined and fixed by polyester film spacers. Considering that, in general, smaller gap length decreases the scattering efficiency and larger gap length deteriorates clarity, the gap length is set at 100 μm in the present test cell. But the effect of the present invention can be still obtained with different cell gap lengths. Then ferroelectric liquid crystal of ZLI-1013, 1011 (Merck Corp.) is filled in the gap, and the periphery is sealed by epoxy adhesive. The liquid crystal is liquefied at 120° C. and then slowly cooled to obtain the smectic C phase.

Figure 2A:
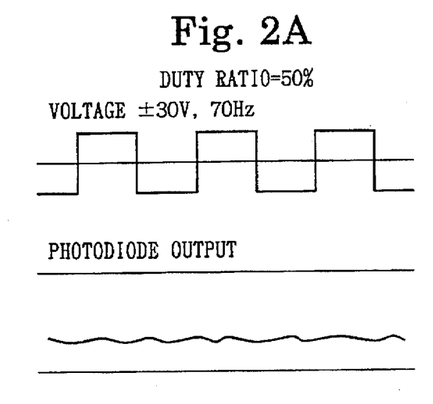
FIG. 2A through graphs showing the relationship between the duty ratio and the modulating efficiency.
Figure 2B:
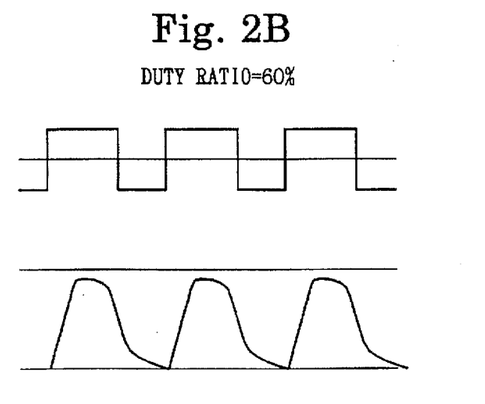
Figure 2C:
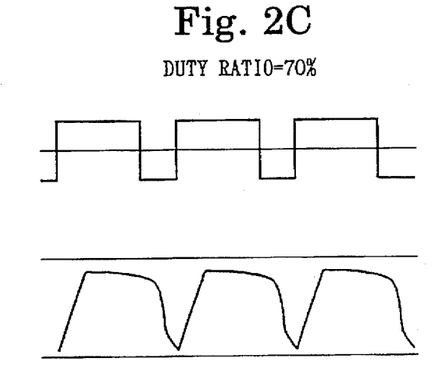
Figure 2D:
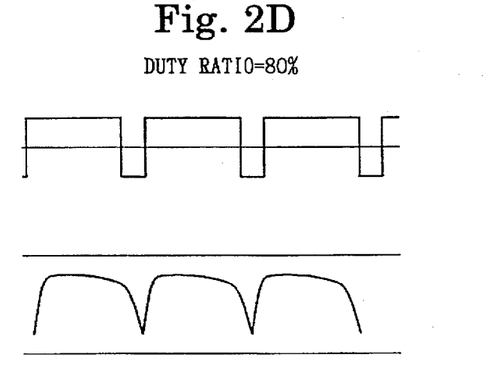
Figure 2E:
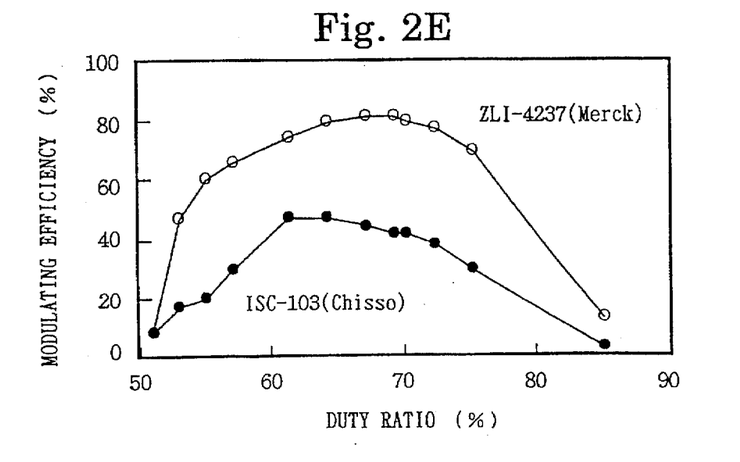

FIGS. 2A–2D show the change in the output of a photodiode receiving light of 1000K black body radiation through the above liquid crystal thick cell with a series of voltage pulses of various duty ratios. The amplitude of the voltage pulses is fixed at ±30 V and the alternating speed is fixed at 70 Hz. FIG. 2A is the conventional case in which the duty ratio is 50%, that is the duration of one polarity and the duration of the other polarity of the electric field over the liquid crystal is the same. Because of the slow movement of the liquid crystal molecules, the output of the photodiode barely changes irrespective of the polarity of voltage pulses. FIGS. 2B, 2C and 2D accord to the present invention in which the duty ratios are 60, 70 and 80%. Remarkable change in the transmittance is generated and high modulating efficiency is obtained at 60% duty ratio. As shown in FIG. 2E, duty ratio of 55 to 85% produces some degree of modulating efficiency and 58 to 75% produces significantly high modulating efficiency for both Merck ZLI4237 liquid crystal and Chisso ISC-103 liquid crystal. The optimal duty ratio may vary according to the modulating frequency.

Figure 3:
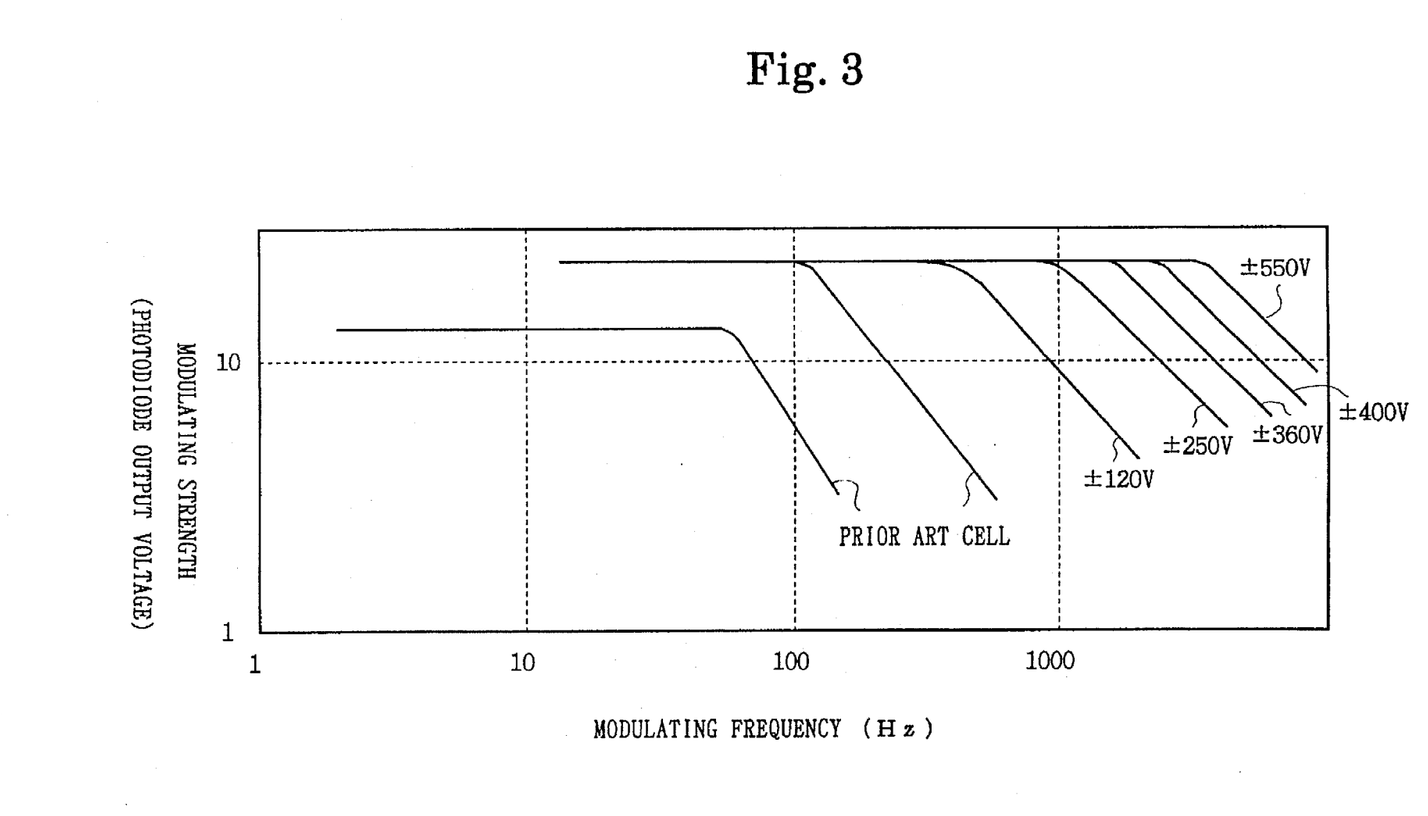
FIG. 3 is a graph of frequency characteristics of liquid crystal cells.

FIG. 3 is the graph of the modulating efficiency of conventional light modulator and that by the present invention with respect to the modulating frequency. It clearly shows that the modulating efficiency is greatly improved at high modulating frequency in the light modulator of the present invention.

Example 2: Test with infrared light

A cell is made with a pair of 20×20 mm silicon plates. Since the specific resistance of the silicon plate is as low as 8–40 Ω·cm, the silicon plates by themselves are used as the electrodes to the liquid crystal. In a corner of each silicon plates is formed a gold island for connecting a lead line to the electrode. On both surfaces of the silicon plates are formed non-reflection coating layers to adequately pass infrared light of 5 μm wavelength. The coating may be changed depending on the light used. The 5 μm wavelength is adopted for the gas analyzers, and 10 μm wavelength can be used for detecting a human body or for measuring temperature of an object. The inner surfaces of the silicon plates are also rubbed for assisting alignment of liquid crystal molecules. The cell gap is set at 100 μm using a polyester film spacer of the same thickness. After liquid crystal (the same liquid crystal as used in Example 1 is also used here) is filled in the gap between the silicon plates, the liquid crystal is subjected to the same heat treatment as in the above Example. The modulating efficiency of the liquid crystal cell of the present test is about 70–50%.

Figure 4A:
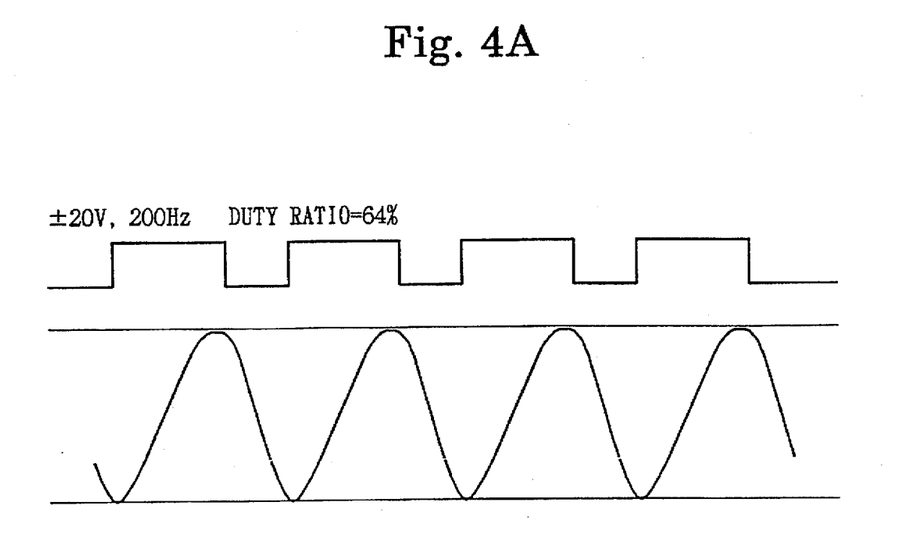
FIGS. 4A and 4B are graphs showing the effect of the alternating frequency of pulses.
Figure 4B:
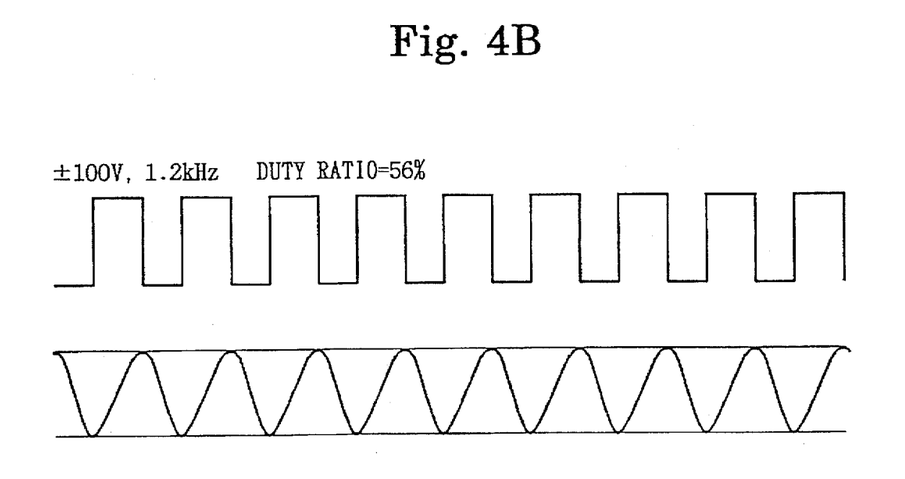

FIGS. 4A and 4B are the graphs of modulating efficiency with non-reflection coating for 5 μm wavelength infrared light. These graphs show that the ferroelectric liquid crystal thick cell of the present example gives considerable modulating efficiency at the modulating frequency of from 200 to 1,200 Hz. The amplitude of the voltage pulses is recommended to increase according to the increase in the modulating frequency.

Example 3

The test cell is made of glass plates with ITO (Indium Tin Oxide) films on the surfaces as the transparent electrodes. The glass plates are rubbed with cotton cloth in one direction for liquid crystal alignment, and then the glasses are fixed with the cell gap of 100 μm using polyester film spacers.

As the length of the cell gap increases, light is scattered more strongly but, on the other hand, the clarity deteriorates in the transparent state. Thus the cell gap of 100 μm is selected considering the both factors. Different cell gap length can be used of course without losing the effect of the present invention. Liquid crystal ZLI-1013, 1011 of Merck corp. is filled in the gap of the cell. The cell is heated to 120° C. to liquefy the liquid crystal and slowly cooled to obtain the smectic C phase.

Figure 5A:
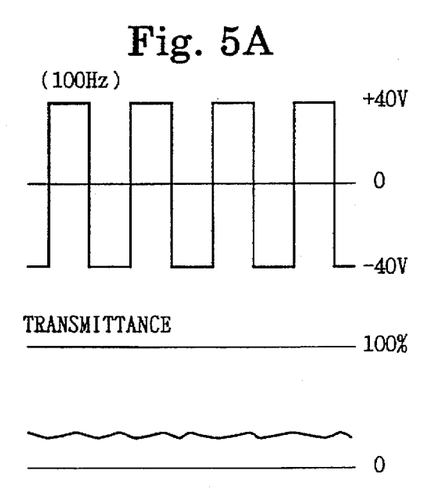
FIGS. 5A through 5C are graphs showing the effect of bias voltage application.
Figure 5B:
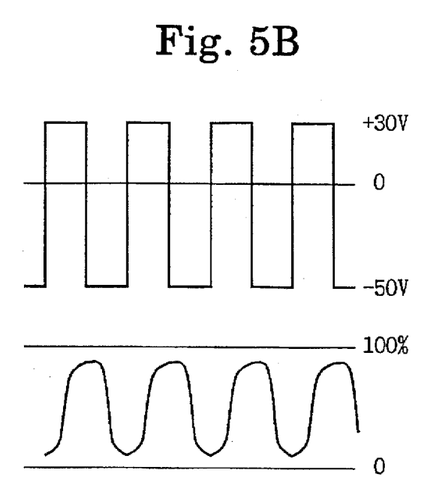
Figure 5C:
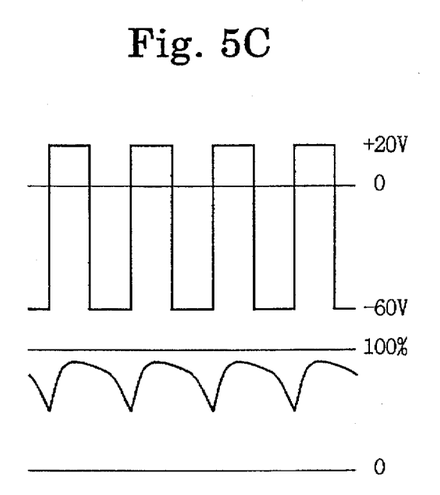

Light (visible light of 638 nm wavelength) from a He-Ne laser is passed through the liquid crystal cell and the light modulated by the liquid crystal cell with 80 V peak to peak voltage pulses is detected by a photodiode. In the present test, a bias DC voltage of 0 V (no bias), 10 V or 20 V is added to the voltage pulses, and the duty ratio is fixed at 50% (i.e., symmetrical). FIG. 5A is the graph of photodiode output and the applied voltage pulses with no bias voltage (0 V). The modulating efficiency is small in this case because the movement of the molecules is so slow that they cannot follow the full change in the electric field. When a DC bias voltage of 10 V or 20 V is added as in FIGS. 5B and 5C, recovery from the light scattering state is quickened and the output of the photodiode closely follows the change in the voltage pulses. Bias voltage of 10–15 V or 25–40% of the amplitude of the voltage pulses gives the largest modulating efficiency, and 20 to 50% of the amplitude produces significant modulating efficiency compared to barely observable modulating efficiency at no bias voltage.

When a direct current (DC) electric field of a polarity is applied over the ferroelectric liquid crystal cell, the molecules of the liquid crystal align along the direction of the electric field, whereby the liquid crystal is optically transparent. When the polarity of the electric field is instantaneously reversed ("instantaneously" means that the reversing time is less than the normal response time of ferroelectric liquid crystal, μsec order), the liquid crystal molecules move randomly because they cannot follow the fast change of the electric field, whereby the light scattering state is made. Since enough light scattering ability is obtained in the early stage of randomization, the liquid crystal molecules can return to the original clear state aligned in the original orientation in a shorter time if the polarity of the applied voltage is returned to the original polarity before the molecules completely realign in the opposite orientation. This reduces the time needed to change the light scattering state to the transparent state. The returning to the original aligned state at halfway to the opposite aligned state is achieved by adding a DC bias to the voltage pulses. The frequency characteristics of the liquid crystal thick cell are greatly improved by the present method of adding a DC bias.

Example 4

Figure 6A:
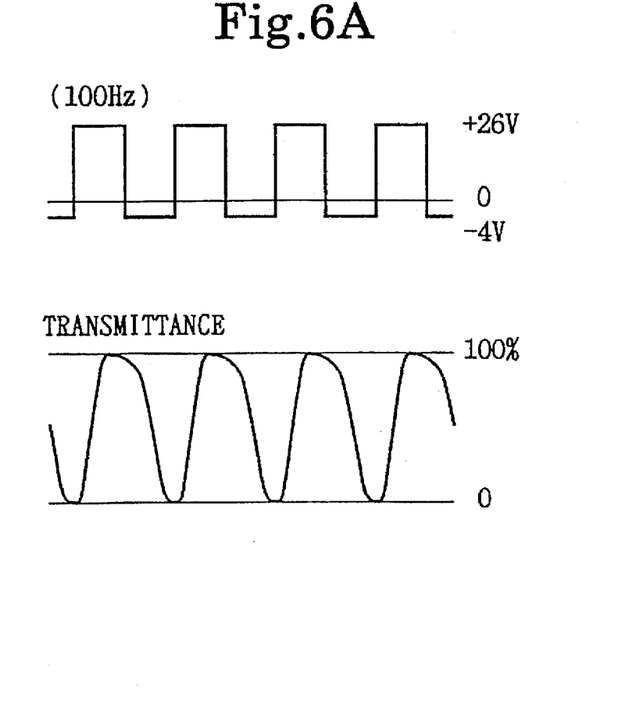
FIGS. 6A and FIG. 6B are graphs showing the effect of bias voltage application.
Figure 6B:
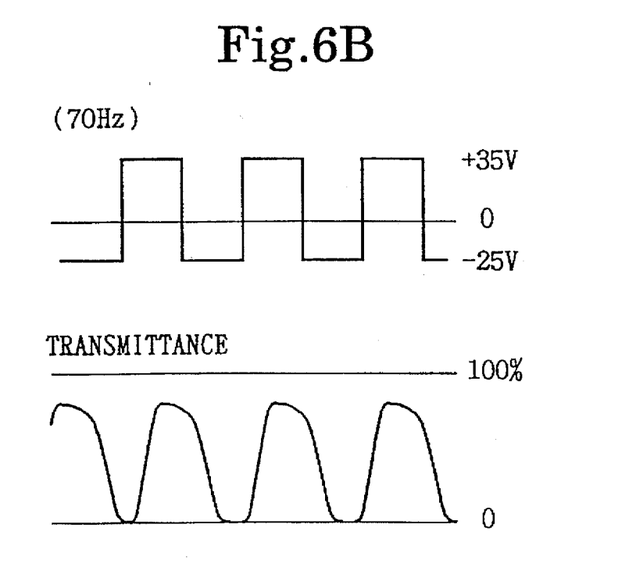

Infrared light of 5 μm wavelength is used to evaluate the same liquid crystal cell as in the Example 1. The result is given in FIG. 6A which shows a similarly favorable modulating efficiency in infrared light. The cell structure is the same as in Example 1. FIG. 6B shows the conspicuous effect of adding DC bias voltage to the voltage pulses on improving the modulating efficiency.

Example 5

When the helical pitch of the cholestic (nematic chiral) phase increases, the helical pitch of the smectic C phase also increases in general. The phenomenon is thus expected in increasing the modulating efficiency. Liquid crystal molecules tend to become immovable when the spontaneous polarization becomes extremely small. The ferroelectric liquid crystal used in the present test is shown in Table 1.

TABLE 1

| | Liquid crystals used | | | | | |
|---|---|---|---|---|---|---|
| | A | B | C | D | E | F |
| Ph. Tr. Temp. | | | | | | |
| $N^* \to ISO$ | 81 | 68 | 85 | 92.2 | 94.6 | 98.1 |
| $S_A \to N^*$ | 69 | 64 | 72 | 75.6 | 77 | 78.5 |
| $S_C \to S_A$ | 54 | 55 | 60 | 64.4 | 66 | 67.6 |
| $C_f \to S_C^*$ | −21 | −20 | −11 | −15 | −16 | −4 |
| Spont. Pol. (25° C.) | | | | | | |
| (nC/cm$^2$) | −5.4 | −9.3 | −34.7 | 18.5 | 11.7 | 5.9 |
| Tilt Angle (deg) | 22 | 26 | 25 | 24.7 | 23.9 | 23.3 |
| Pitch Length | | | | | | |
| CrorN*phase (μM) | 32 (71° C.) | 27 (66° C.) | 14 (72° C.) | 16.2 (77° C.) | 22.5 (78° C.) | 25 (80° C.) |
| Sc phase (μm) | 5 (25° C.) | 27 (25° C.) | 14 (25° C.) | 21 (25° C.) | 28 (25° C.) | 42 (25° C.) |
| Response Time | | | | | | |
| (μsec) | 232 | 184 | 56 | 75 | 91.5 | 126 |

(Ph. Tr. Temp. = phase transition temperature)
(Spont. Pol. = spontaneous polarization)

The spontaneous polarization of ferroelectric liquid crystals in Table 1 generally decreases as the helical pitch increases. When the liquid crystal F (which has the smallest spontaneous polarization value) in Table 1 is used, a favorable modulating efficiency is obtained.

Figure 7:
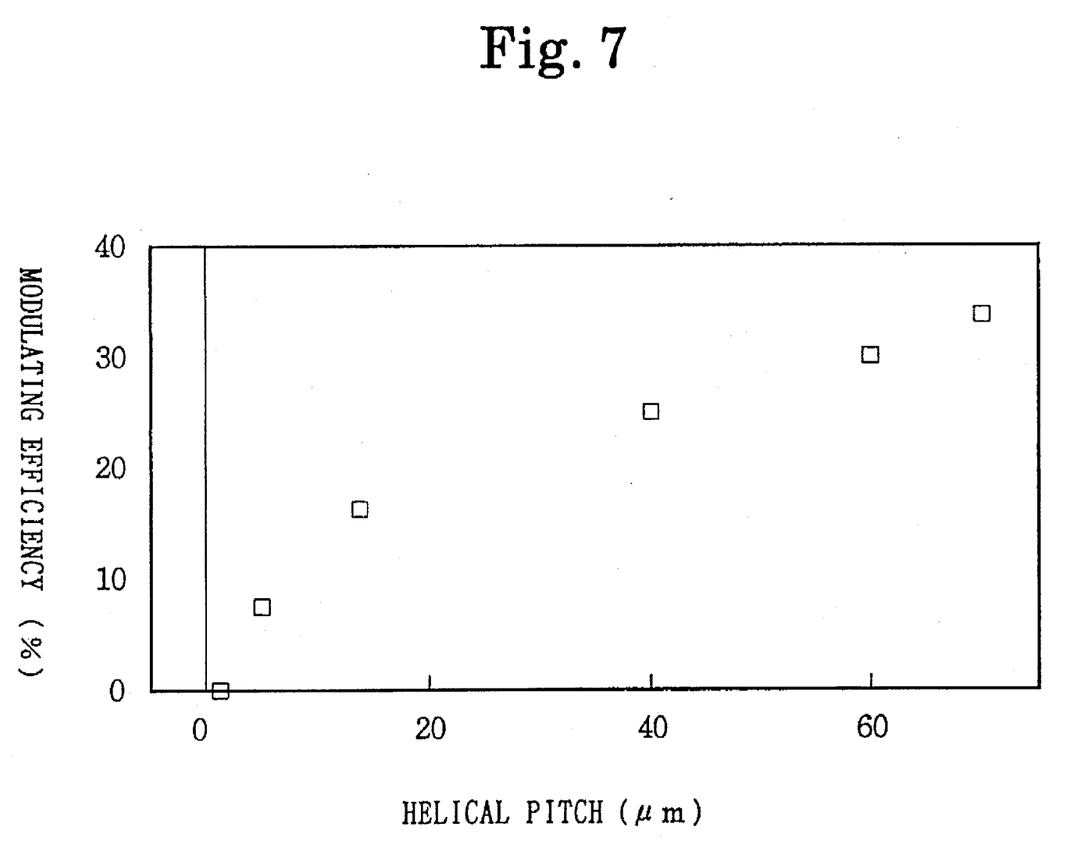
FIG. 7 is a graph of modulating efficiency vs. helical pitch.

The modulating efficiency of the ferroelectric liquid crystals in Table 1 for 5 μm wavelength middle infrared light is shown in FIG. 7. The liquid crystals are contained in the thick cell shown in FIG. 8, where numerals 2 and 3 denote silicon electrode plates having specific resistance of 20 Ω·cm and 400 μm thickness, numeral 4 is the ferroelectric liquid crystal, numerals 5 and 6 are spacers of 100 μm thickness, numeral 8 are lead lines, and numeral 9 are non-reflection coating for the 5 μm wavelength.

Figure 9:
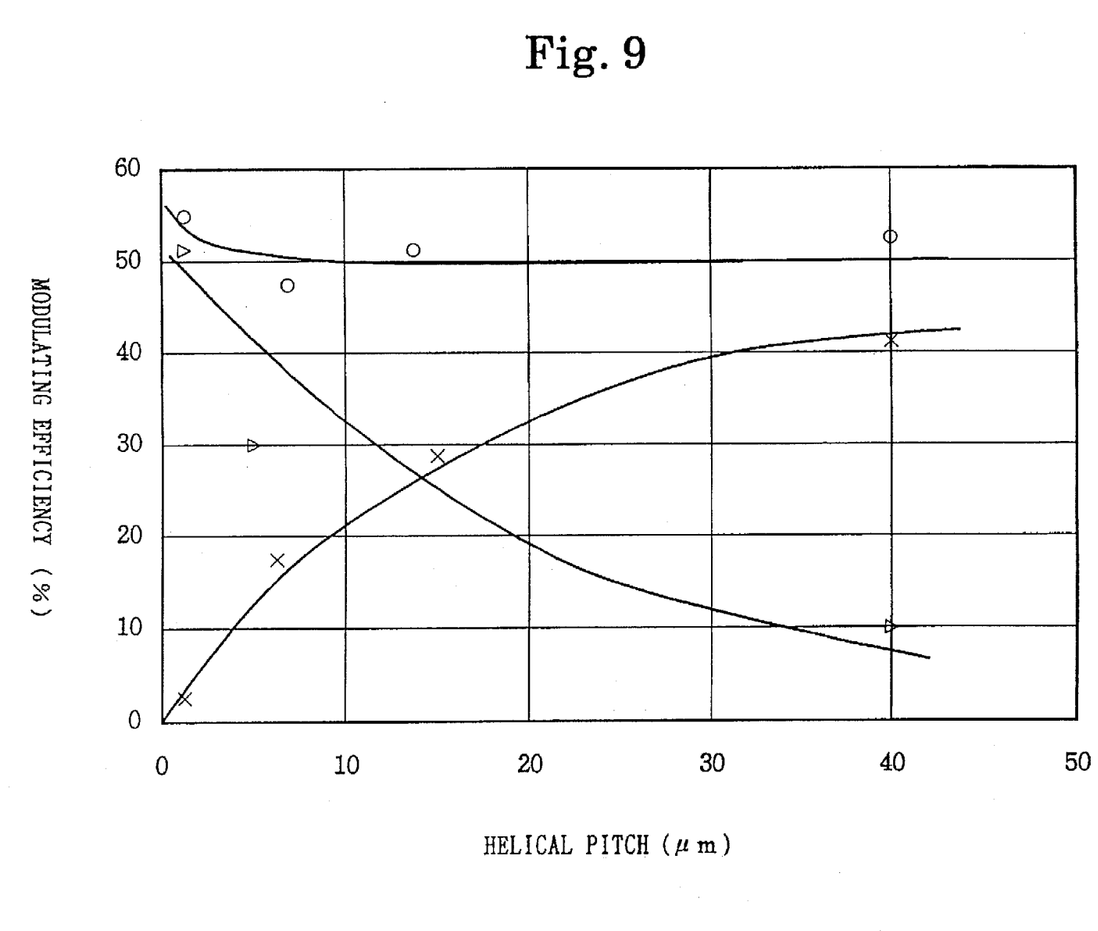
FIG. 9 is a graph of modulating efficiency and transmittance vs. helical pitch.
Figure 10:
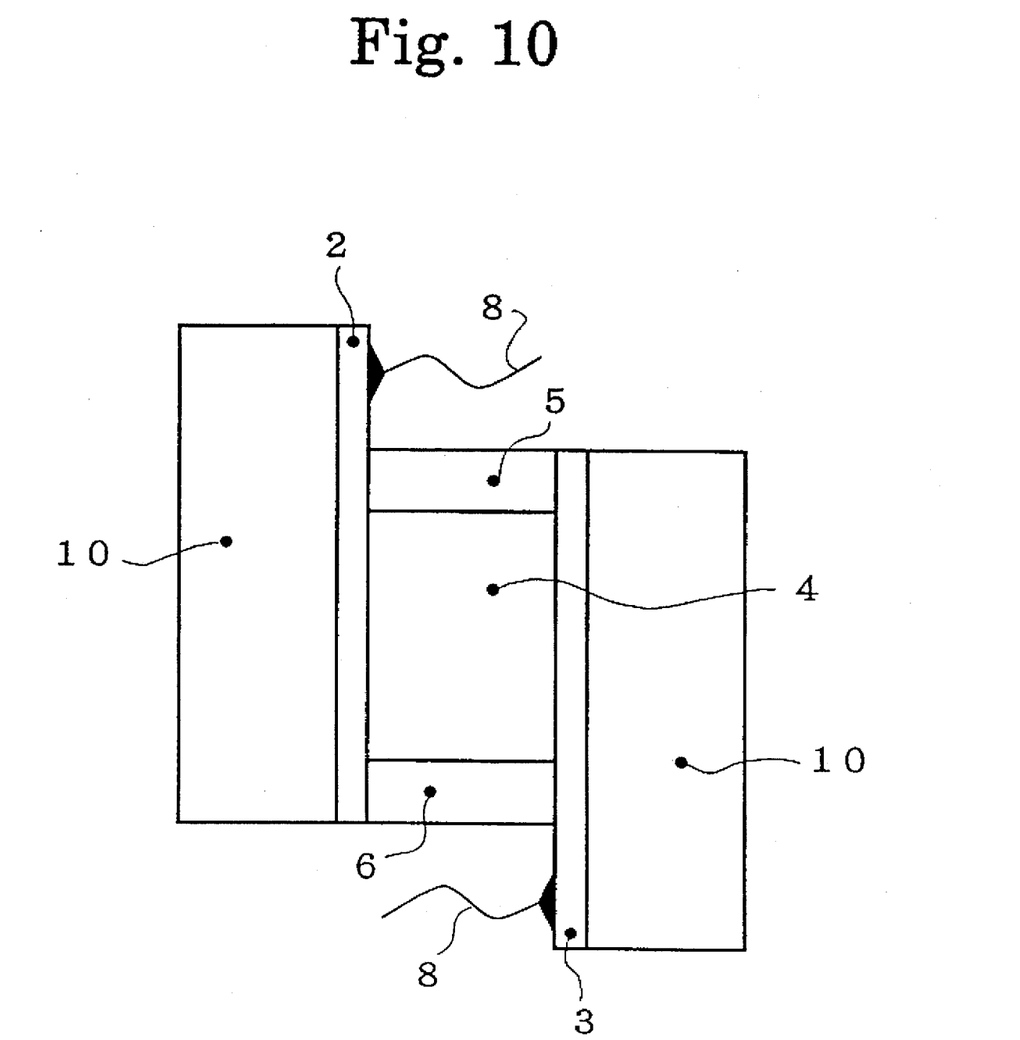
FIG. 10 is a cross sectional view of another liquid crystal thick cell.

The modulating efficiency with respect to the helical pitch of the liquid crystal is measured for 2 μm middle infrared light. The result is shown in FIG. 9, in which o denotes transmittance (%) in the transparent state, x denotes modulating efficiency, and Δ denotes transmittance (%) in the light scattering state. The liquid crystal is contained in the cell of FIG. 10, where numerals 2 and 3 are ITO electrodes, numeral 4 is the ferroelectric liquid crystal, numerals 5 and 6 are spacers of 100 μm thickness, numeral 8 are lead lines and numeral 10 are quartz plates of 1 mm thickness. The voltage pulses applied on the electrodes are as shown in FIG. 4A. As seen in the graphs of FIGS. 7 and 9, the modulating efficiency strongly depends on both the helical pitch and the cell gap.

Example 6

Figure 8:
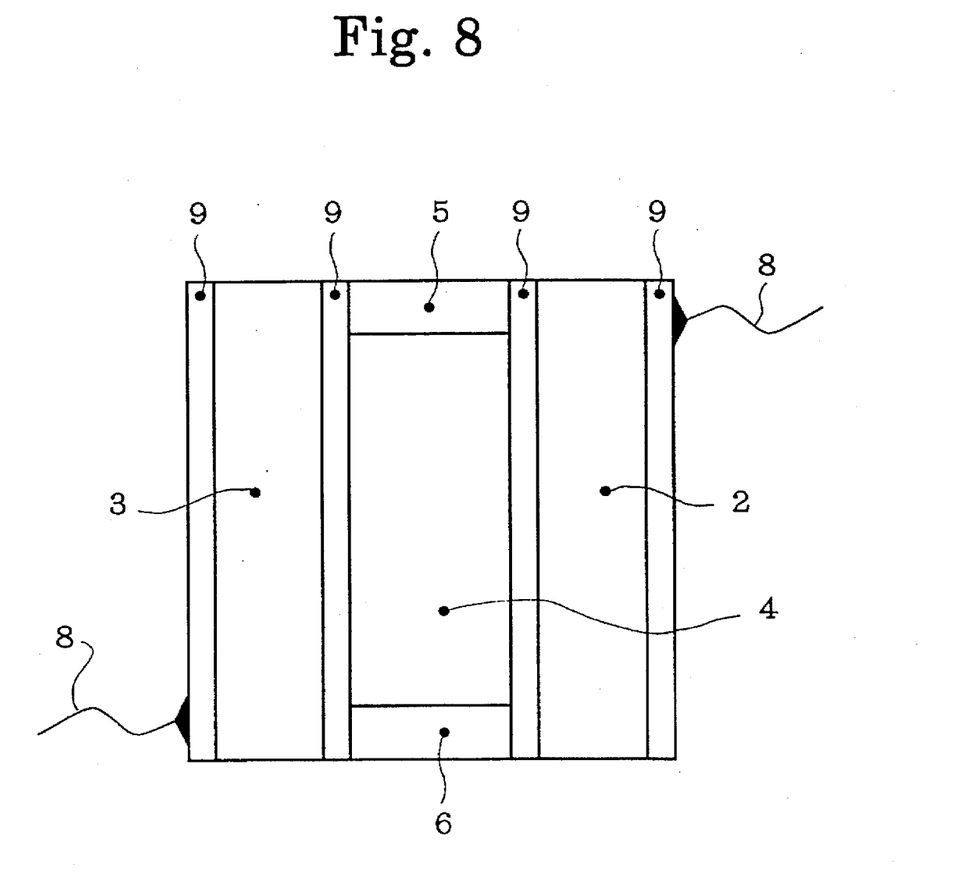
FIG. 8 is a cross sectional view of a liquid crystal thick cell.
Figure 11:
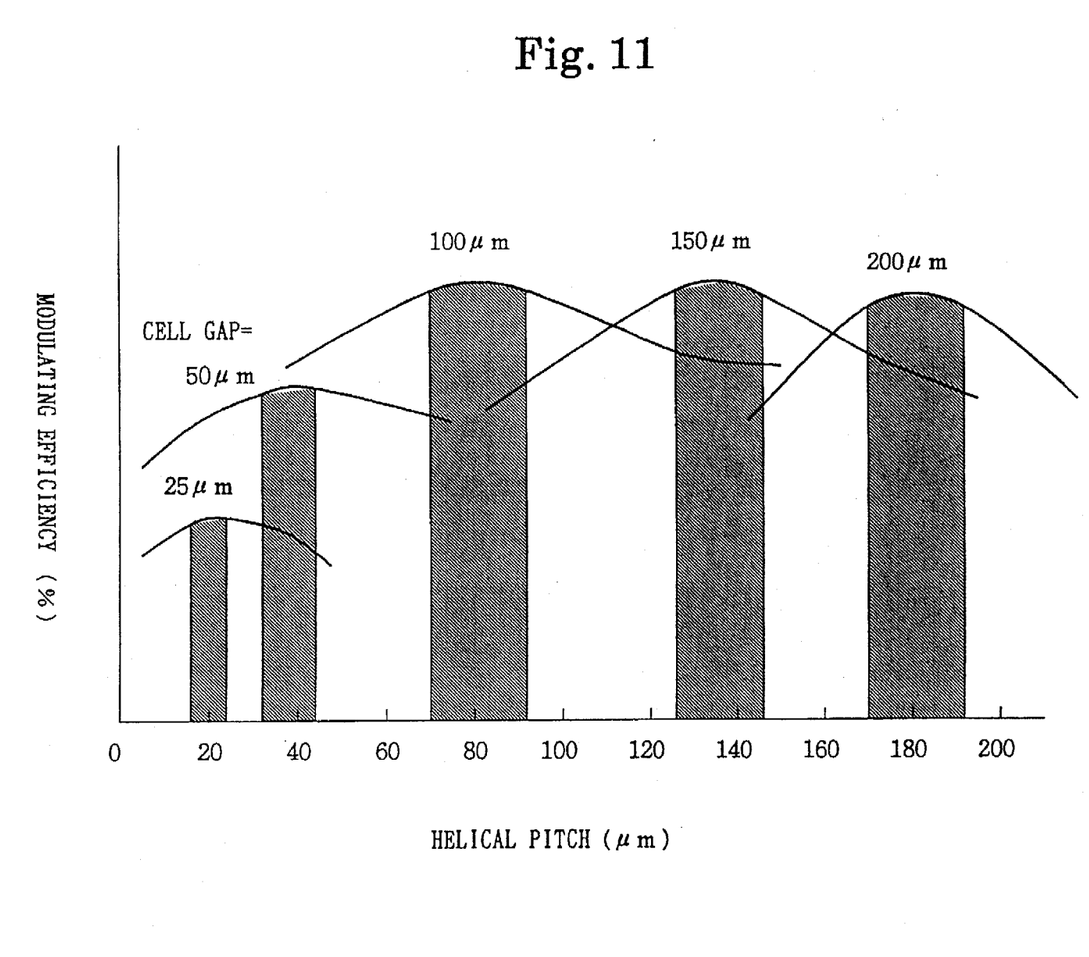
FIG. 11 is a graph of modulating efficiency vs. helical pitch for various cell gap values.

The length of the cell gap is changed using spacers of different thickness in the liquid crystal thick cell light modulator of FIG. 8, and the modulating efficiency of the liquid crystal cell for 2 μm wavelength near infrared light is measured. The voltage pulses applied on the electrodes are as shown in FIG. 4A. The result is shown in FIG. 11. As seen in FIG. 11, the modulating efficiency becomes maximum when the helical pitch is 0.7 to 0.95 times the length of the cell gap among the light modulators of the same cell gap. The absolute maximum modulating efficiency is obtained at the cell gap of over 100 μm.

What is claimed is:

1. A liquid crystal thick cell light modulator comprising:
   a thick cell containing ferroelectric liquid crystal between a pair of parallel electrode plates; and
   a voltage applying circuit for applying a series of voltage pulses with an asymmetrical duty ratio between the pair of electrode plates.

2. The liquid crystal thick cell light modulator according to claim 1, wherein the duty ratio is from 55 to 85%.

3. The liquid crystal thick cell light modulator according to claim 1, wherein the duty ratio is from 58 to 75%.

4. A liquid crystal thick cell light modulator comprising:
   a thick cell containing ferroelectric liquid crystal between a pair of parallel electrode plates; and
   a voltage applying circuit for applying a series of voltage pulses with a DC bias voltage added to the voltage pulses between the pair of electrode plates.

5. The liquid crystal thick cell light modulator according to claim 4, wherein the DC bias is from 20 to 50% of the half amplitude of the voltage pulses.

6. The liquid crystal thick cell light modulator according to claim 4, wherein the DC bias is from 25 to 40% of the half amplitude of the voltage pulses.

7. A liquid crystal thick cell light modulator comprising:
   a thick cell including a pair of parallel electrode plates with a gap length between the electrode plates larger than 50 μm;
   ferroelectric liquid crystal contained between the pair of electrode plates with a helical pitch of the ferroelectric liquid crystal in smectic C phase being 0.7 to 0.95 times the gap length; and
   a voltage applying circuit for applying a series of voltage pulses between the electrode plates.

8. The liquid crystal thick cell light modulator according to claim 7, wherein the helical pitch of the ferroelectric liquid crystal in smectic C phase is 0.8 to 0.9 times the gap length.

* * * * *